United States Patent
Ishikawa

(10) Patent No.: US 6,513,958 B2
(45) Date of Patent: Feb. 4, 2003

(54) VEHICLE LAMP SYSTEM

(75) Inventor: Masaaki Ishikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/984,246

(22) Filed: Oct. 29, 2001

(65) Prior Publication Data

US 2002/0051364 A1 May 2, 2002

(30) Foreign Application Priority Data

Oct. 27, 2000 (JP) ........................................ 2000-328634

(51) Int. Cl.$^7$ ................................................. B60Q 1/08
(52) U.S. Cl. ...................... 362/466; 362/467; 318/646; 318/651; 318/685
(58) Field of Search ................................ 362/466, 467; 318/646, 651, 685

(56) References Cited

U.S. PATENT DOCUMENTS

| | | | | |
|---|---|---|---|---|
| 5,130,903 A | * | 7/1992 | Fast et al. ..................... | 362/466 |
| 5,488,546 A | * | 1/1996 | Sato et al. ..................... | 362/466 |
| 5,599,085 A | * | 2/1997 | Tabata et al. ................ | 362/467 |
| 5,769,525 A |   | 6/1998 | Daumueller et al. |  |
| 5,907,196 A | * | 5/1999 | Hayami et al. .............. | 362/466 |
| 5,931,572 A | * | 8/1999 | Gotoh .......................... | 362/466 |
| 6,206,555 B1 |   | 3/2001 | Redzinsky et al. |  |
| 6,220,735 B1 | * | 4/2001 | Matubara ..................... | 362/464 |
| 6,254,259 B1 | * | 7/2001 | Kobayashi ................... | 362/467 |
| 6,305,823 B1 | * | 10/2001 | Toda et al. .................. | 362/467 |

FOREIGN PATENT DOCUMENTS

| | | | | |
|---|---|---|---|---|
| GB | 2325757 A | 2/1988 | ........... | B60Q/1/115 |
| GB | 2325758 A | 2/1998 | ........... | B60Q/1/115 |
| GB | 2345747 A | 7/2000 | ............. | B60Q/1/14 |

\* cited by examiner

Primary Examiner—Sandra O'Shea
Assistant Examiner—Ismael Negron
(74) Attorney, Agent, or Firm—Sughrue Mion, PLLC

(57) ABSTRACT

A vehicle lamp system 1 having a leveling mechanism 2 for controlling the posture of a reflector RF and a stepping motor 3 as a driving source of the leveling mechanism. The lamp system has a detector 5 which may determine whether an external force, such as a vibration or a shock is given to the reflector RF or if there is a possibility that the vibration or shock may be given to the reflector. A rotor is prevented from being deviated from the original position by exciting each phase coil of the stepping motor with the same excitation phase as the last excitation phase at the time when the stepping motor 3 was last driven or otherwise a coil in only one of the last excitation phases at the time when the stepping motor 3 was last driven, and before vibration or a shock is given to the reflector RF after the coils in the respective phases are totally set to a non-excited condition in the stepping motor 3.

11 Claims, 11 Drawing Sheets

VEHICLE LAMP SYSTEM

BACKGROUND OF THE INVENTION

1. Field of the Invention

The present invention relates to a vehicle lamp system, and more particularly, to a vehicle lamp system having an irradiation axis regulating mechanism (or, in other terms, a leveling mechanism) and a method to improve vibration damping and shock resistance of the vehicle lamp system.

2. Description of the Related Art

There is a known mechanism for use in a vehicle lamp system which functions to automatically control an irradiation axis or cause the irradiation axis to be varied through manual operation. For example, this mechanism, such as an auto leveling instrument can regularly correct the direction of light emission from a lighting device by denying variation in the drive posture of a vehicle, which prevents the direction of light emission from the lighting device affixed to the vehicle from being unsettled due to the variation in the posture of the vehicle in its direction of travel. Other instruments are known that correct the optical axis so that the irradiation light does not vary in an undesirable direction due to a variation in the number of passengers or in the cargo-loading condition of the vehicle.

Further, a stepping motor has also been known as a driving source in an instrument of the sort mentioned above in an attempt to save electric power by stopping supply of power to the unoperated stepping motor so as to bring about the unexcited condition of each phase coil of the stepping motor.

However, one problem with such conventional instruments is that they tend to not produce a positional deviation, or an off-key condition arising from the absence of or a decrease in the holding force of a rotor during a shock condition when the stepping motor is unoperated because priority is given to power saving in the system, and therefore, vibration damping and shock resistance are not sufficiently ensured.

SUMMARY OF THE INVENTION

It is therefore an object of the present invention to sufficiently increase the vibration damping and shock resistance of an irradiation axis regulating mechanism using, for example, a stepping motor as a driving source.

In order to solve the foregoing problems, a vehicle lamp system according to the invention comprises a leveling mechanism for controlling the posture of a reflector using, for example, a stepping motor as a driving source of the leveling mechanism and is characterized in that each phase coil of the stepping motor may be excited with the same excitation phase as the last excitation phase at the time when the stepping motor was last driven or otherwise a coil in one of the last excitation phases at the time when the stepping motor was last driven before an external force, such as vibration or a shock is given to the reflector after the coils in the respective phases are totally set to a non-excited condition in the stepping motor.

It is therefore possible to prevent a rotor from being deviated from the original position or set out of tune by predicting the vibration or shock given to a reflector and causing a motor to generate necessary and sufficient holding torque.

DETAILED DESCRIPTION OF THE INVENTION

Figure 1:
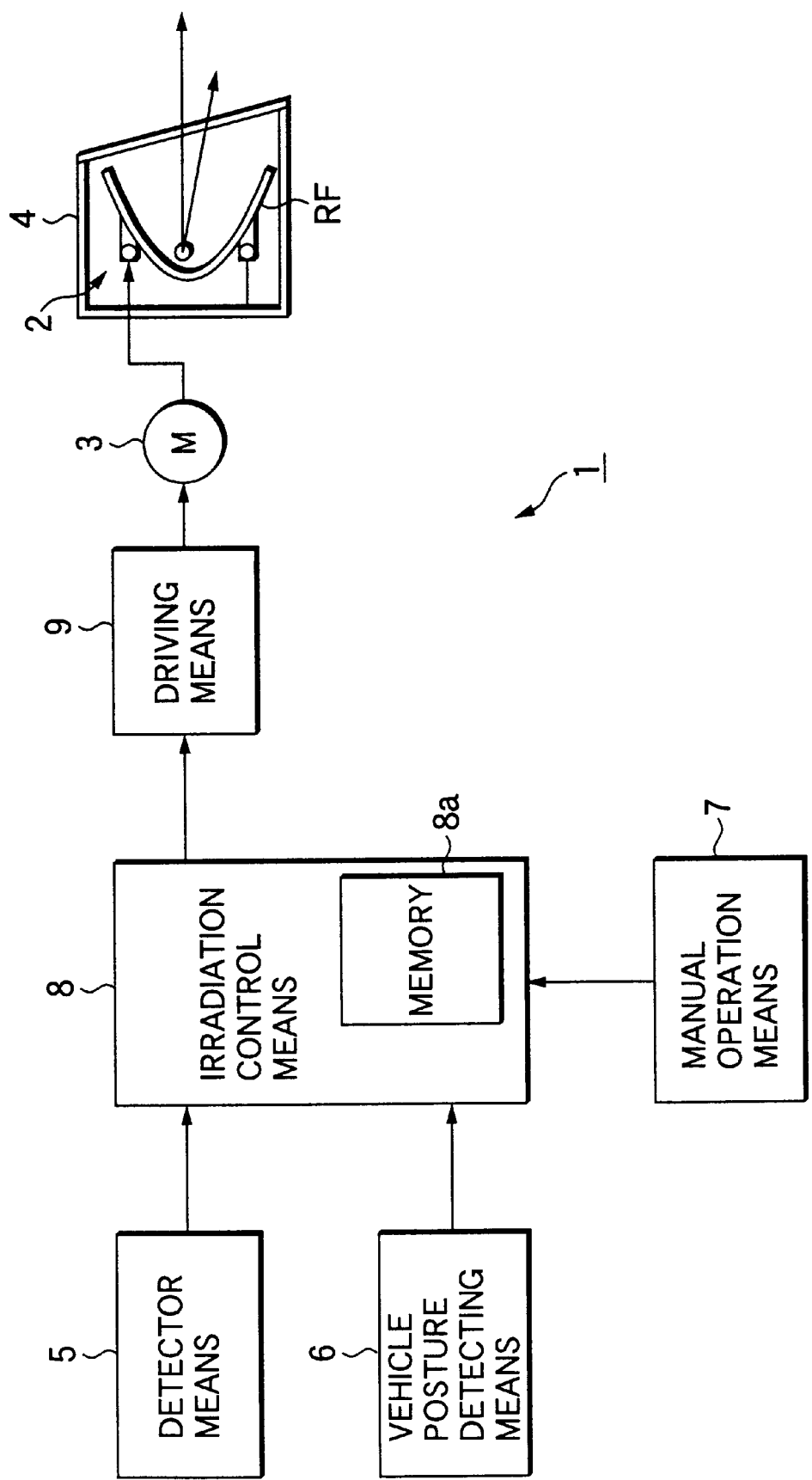
FIG. 1 is a block diagram showing one embodiment of a vehicle lamp system according to the present invention.

As shown in FIG. 1, one embodiment of a vehicle lamp system 1 according to the present invention uses both an irradiation axis regulating means to respond to a variation in the vehicle posture and an irradiation axis regulating means for use in a manual operation. In this embodiment, one of these means may properly be selected according to the particular use.

The vehicle lamp system 1 may be provided with a leveling mechanism 2 for controlling the posture of a reflector RF, and a stepping motor 3 as a driving source.

One of ordinary skill in the art would recognize that while the lighting device 4 having the reflector RF shown in FIG. 1 is depicted for use in an automotive lamp, such as, for example, a headlamp or a fog lamp, the lighting device 4 maybe applicable for other uses.

The vehicle lamp system 1 also includes a detection means 5 for predicting a vibration or shock to be given to the reflector RF, a vehicle posture detection means 6, an irradiation control means 8 (such as, for example, an electronic control unit containing a computer with a memory 8a) and a driving means 9 (such as a motor drive circuit). In this case, a control command is sent out from the irradiation control means 8 via the driving means 9 to the stepping motor 3, so that the direction of light emission from the lighting device 4 may be controlled. The vehicle posture detection means 6 may be used to make optical axis corrections such that irradiation light is always emitted in a predetermined direction by detecting vehicle posture data (such as a pitch angle) in an auto leveling instrument, and denying variation in the direction of light emission accompanied with variation in the vehicle posture. Moreover, the manual operation means 7 may be used to offset the forwardly-upwardly directed irradiation axis of a headlamp by adjusting the direction of the irradiation axis of the lighting device 4 where load distribution in a vehicle varies because of, for example, a heavy object loaded in the rear of the vehicle which causes the irradiation axis of the headlamp to be directed forward and upward against the horizontal plane.

The detection means 5 may be used to predict the vibration or shock given to the reflector RF before the vibration or shock is given thereto. That is, after coils in respective phases are set to a non-excited condition in the stepping motor 3, a detection signal is sent to the irradiation control means 8. In other words, the detection means 5 may be provided so as to predict the vibration or shock given to the reflector RF or that there is a high probability that the reflector RF will receive the vibration or shock.

Although there may be enumerated methods of detecting or determining an external force, such as a sign of shock and the like in addition to the vibration detection means attached to the lighting device 4 or the reflector RF, the following modes (I–III) may be particularly addressed by the present invention as a time lag resulting from the time required for detection may remain problematical (i.e., if the time lag is noticeable, motor-coil excitation control to be performed in response to a shock and the like may be too late).

(I) A mode wherein a switching mechanism for switching a plurality of beam emissions is provided, and wherein a detection means for predicting the vibration or shock expected to be given to a reflector at the time of switching the beams based on an operation command given to the switching mechanism (i.e., the presence or absence of the switching).

(II) A mode wherein a control mechanism for controlling the luminous intensity distribution of a lighting device is provided and wherein use is made of a detection means for predicting the vibration or shock expected to be given to a reflector when the luminous intensity distribution is caused to vary according to a control command given to the control mechanism (i.e., the presence or absence of variation in the luminous intensity distribution).

(III) A mode wherein a control mechanism for varying the color of illumination light is provided, and wherein use is made of a detection means for predicting the vibration or shock expected to be given to a reflector when the light color is caused to vary according to a control command given to the control mechanism (i.e., the presence or absence of variation in the light color).

Figure 2:
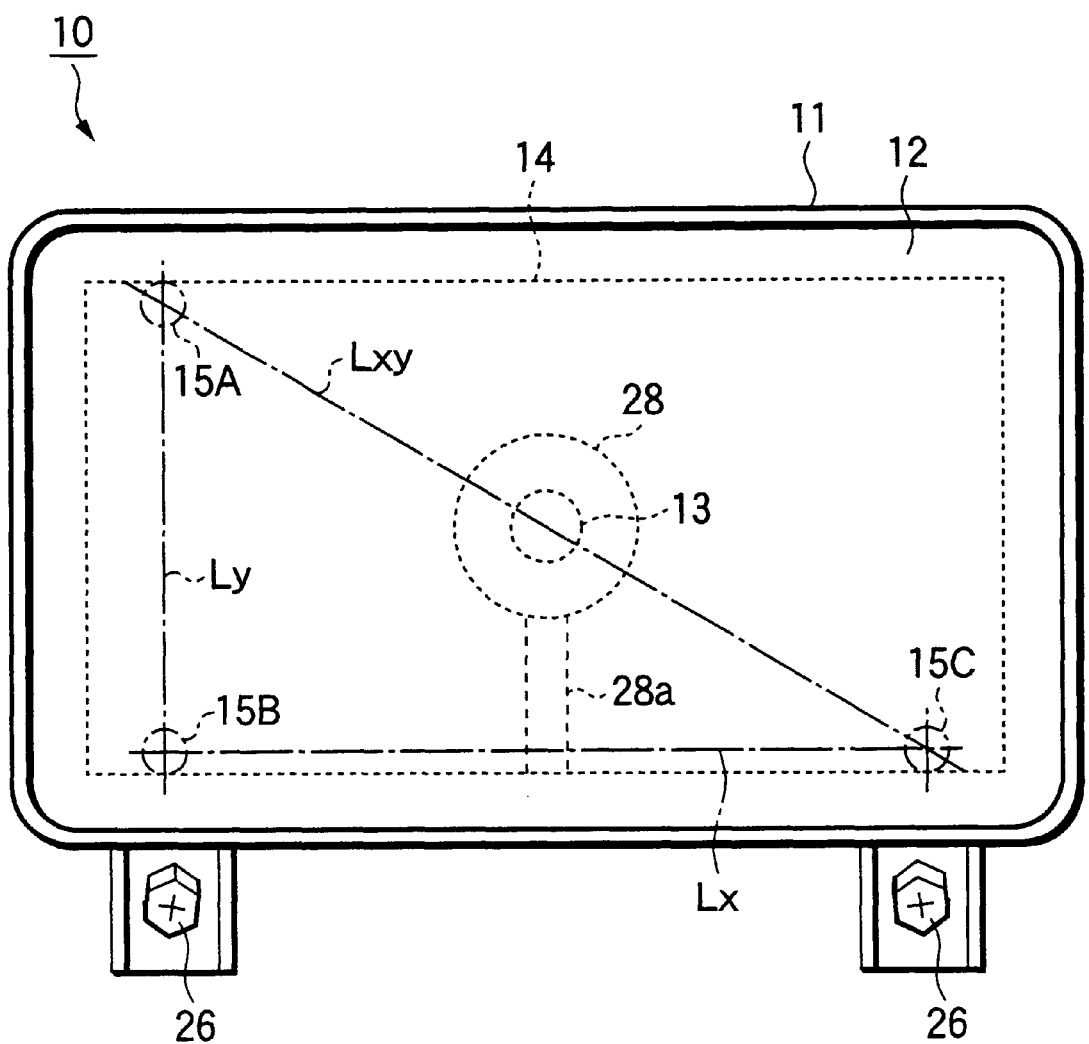
FIG. 2 is an elevational view of a lighting device according to one embodiment of the present invention.
Figure 3:
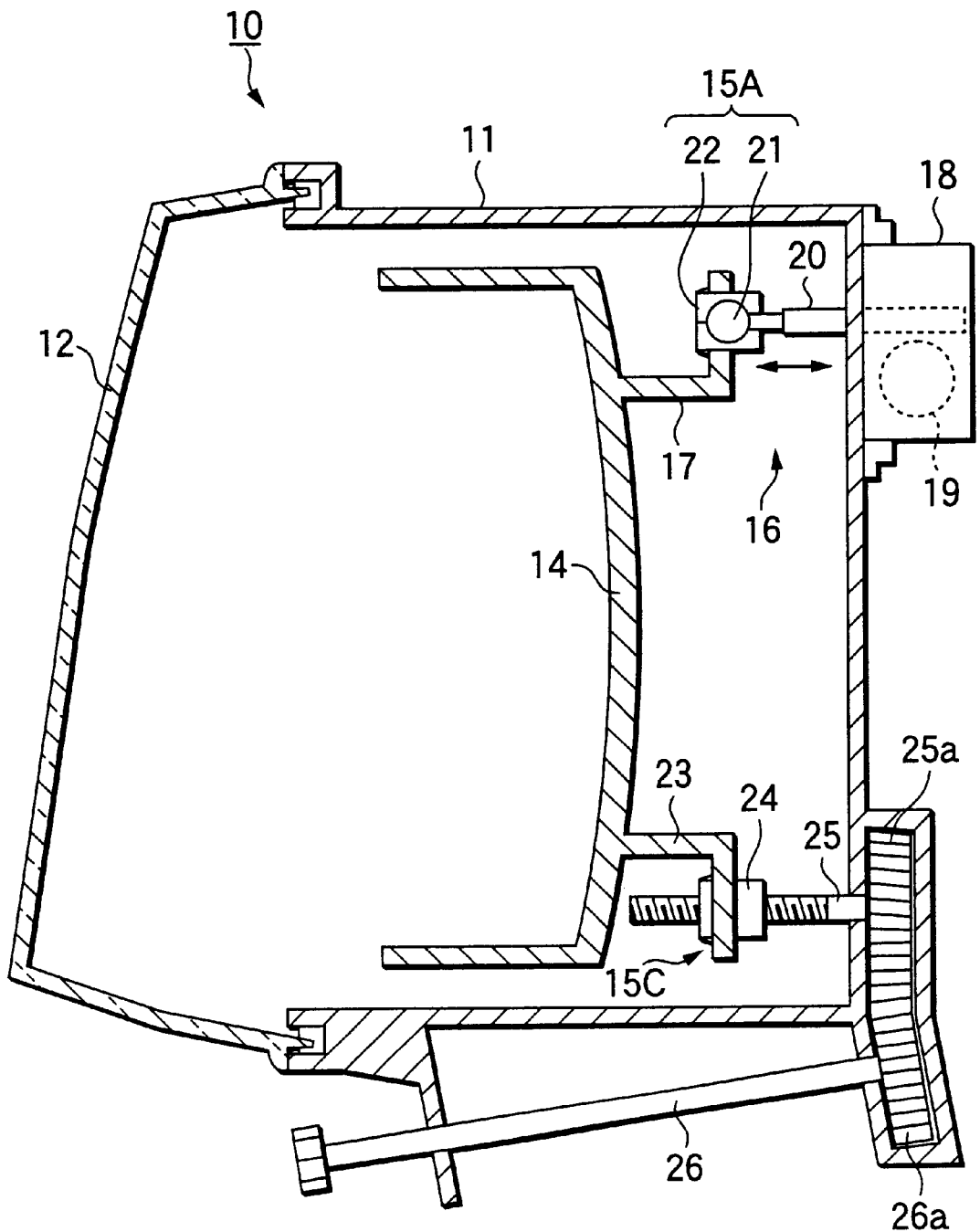
FIG. 3 is a schematic diagram of a leveling mechanism.
Figure 4:
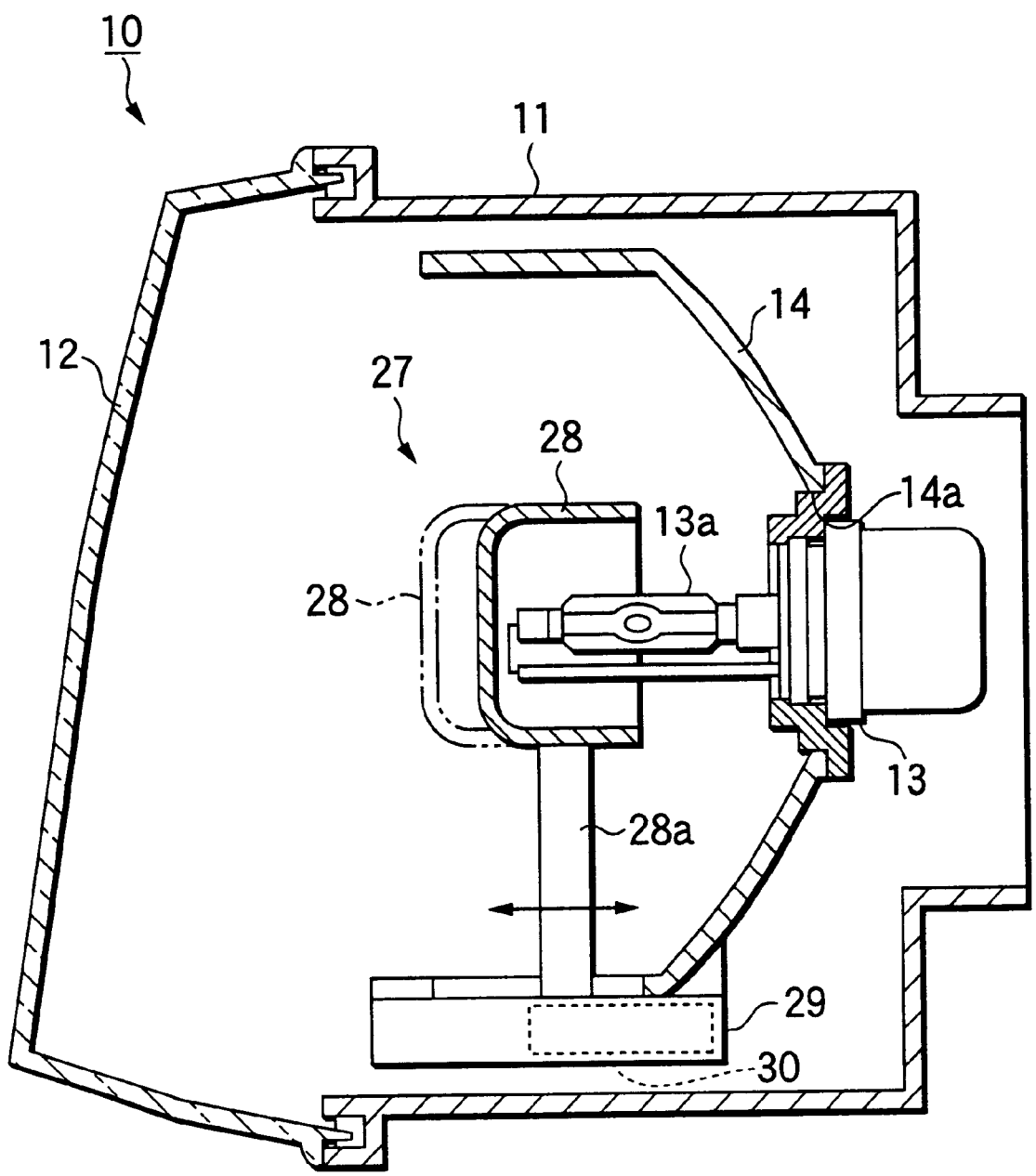
FIG. 4 is a schematic diagram of a beam switching mechanism.

FIGS. 2 to 4 show the configuration of a lighting device according to an embodiment of the present invention employed in a mode (I) situation in which the switching mechanism is used for switching high and low beam emissions within one lighting device.

As shown in FIG. 2, a lighting device 10 includes a light source 13 and a reflector 14 (shown by a broken line therein) in a lamp chamber formed with a lamp body 11 and a lens 12. The reflector 14, may be fitted to the lamp body 11 with three supports in the positions shown by 15A, 15B and 15C; of course, other fitting configurations are not precluded. Position 15A is a rocking fulcrum of ball-and-socket joint structure, and positions 15B and 15C represent moving fulcrums for causing an aiming mechanism to move the reflector 14 in a longitudinal direction (in the direction of light emission from the lighting device). More specifically, a vertical axis 'Ly' connecting 15A and 15B perpendicularly crosses a horizontal axis 'Lx' connecting 15B and 15C as viewed from the front of the lighting device. Thus, the light source 13 is positioned in the middle of an inclined axis 'Lxy' connecting 15A and 15C, wherein these three axes form a right triangle with the triangle's 90 degree angle shown in FIG. 1 nearest to position 15B.

FIG. 3 shows a leveling mechanism 16, which supports an extended portion 17 projecting backward from the back of the reflector 14. A leveling unit 18 is attached to the rear face of the lamp body 11 and contains a stepping motor 19 and also known transmission mechanisms (for example, a worm gear, a worm wheel, etc.) that maybe used for converting the rotating force of the motor into a linear moving force of rod 20 for transmitting purposes. Further, a ball portion 21 is formed at the front end of rod 20, and a ball-receiving member 22 is fitted to the extended portion 17, whereby the rocking fulcrum 15A is formed. In operation, the reflector 14 may be tilted around the horizontal axis Lx by moving rod 20 longitudinally (the direction of the optical axis is thus varied).

A nut member 24 may be fitted to an extended portion 23 projecting backward from a position close to the lower end of the back of the reflector 14 and screwed onto an aiming screw 25 fitted to the portion of the lamp body 11. Further, an operating rod 26 that is seen tilted in side view may be fitted to the lower side portion of the lamp body 11. Also, gear 26a, provided in the rear end portion of the operating rod 26, is made to engage with gear 25a provided at the rear end of the aiming screw 25, so that the extended portion 23 and the nut member 24 may be moved along the longitudinal direction of the lighting device 10 by turning the operating rod 26 with, for example, a screwdriver. A portion where the nut member 24 is screwed onto the aiming screw 25 corresponds to the moving fulcrum 15C and therefore, the moving fulcrum 15C is made movable longitudinally by operating the operating rod 26. Therefore, using operating rod 26, the reflector 14 can be tilted on the vertical axis Ly. In this embodiment, the same mechanism is employed for both the moving fulcrum 15C and also the moving fulcrum 15B (therefore, the description of the moving fulcrum 15B is omitted).

FIG. 4 shows a beam switching mechanism 27. A hole 14a for use in arranging the light source is formed in the central portion of the reflector 14 formed of, for example, a synthetic resin, and the light emitting portion 13a of the light source 13 is passed through this hole and positioned in the space formed with the lens 12 and the reflector 14. Although a discharge lamp is used as the light source in FIG. 4, an incandescent lamp or the like may also be used.

Further, a shade 28 used as a shading member may be provided to cover the light emitting portion 13a of the light source 13 from the front side. A carrying mechanism 29 for moving the shade along the longitudinal direction may also be provided.

The carrying mechanism 29 may be fitted to the base of the reflector 14 and provided with a solenoid 30 for longitudinally moving the support leg 28a of the shade 28. As the support leg 28a of the shade 28 is longitudinally moved from a first to a second position by exciting the solenoid 30, the reflective area created when the light emitted from the light emitting portion 13a reflected from the reflector 14 differs between a first position where the shade 38 is set closer to the surface (reflective surface) side of the reflector 14 as shown by a solid line of FIG. 4, and a second position where the shade 38 is set away from the surface thereof as shown by a chain double-dashed line of FIG. 4. Accordingly, the reflective area and the lens step configuration of the lens 12 are so regulated that the difference between both the reflective areas appear as a difference in the luminous intensity distribution between the high and low beams. The detailed description of the method of dividing the reflective area used according to the position of the shade 28, the shape of the reflective surface, and the like will be omitted because various methods and modes of providing them including those disclosed in JP-A-9-92005 can be referred to.

While the driving source of the carrying mechanism 29 participating in switching the shade positions is not limited to use of a solenoid, a device such as a solenoid or an electromagnetic plunger have shown to be effective in reducing the beam switching time.

Since a mechanical means is used for switching beams with the carrying mechanism 29 in the above-described arrangement, shock or vibration given to the reflector 14 may then cause problems. In other words, while the direction of the optical axis is being adjusted by the leveling mechanism 16 or after the direction thereof is adjusted thereby, there is the possibility that the leveling condition may go wrong when a shock and the like are given to the reflector 14 in case where switching of beams is carried out.

Therefore, when the detection means 5 detects a beam-switching signal, the irradiation control means 8 secures holding-torque by subjecting the stepping motor to the same excitation phase as the last excitation phase when the stepping motor was last driven, or only one of the relevant excitation phases (the irradiation control means 8 may store the last excitation phase at the time of last driving the stepping motor, effectively memorizing that phase). In other words, since the possibility that a shock may be given to the reflector 14 at the time of switching beams is considered to be great, it is preferred to predict a shock and the like to be given to the reflector 14 with the beam-switching signal as a substitute signal and cause a holding force to be generated in the stepping motor 19 before the leveling mechanism 16 is badly affected by the shock.

Figure 5:
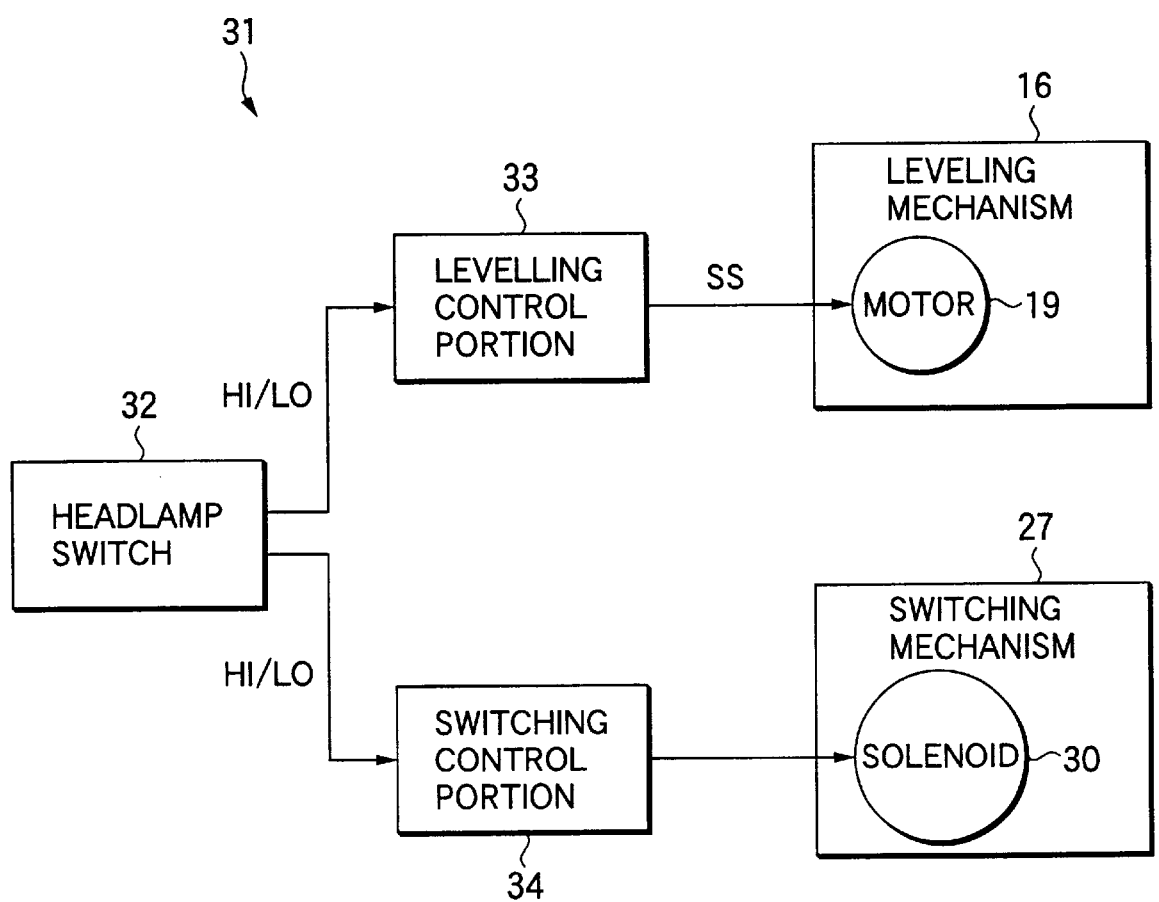
FIG. 5 is a block diagram showing an embodiment of the invention including a two-lamp type automotive headlamp system.
Figure 6:
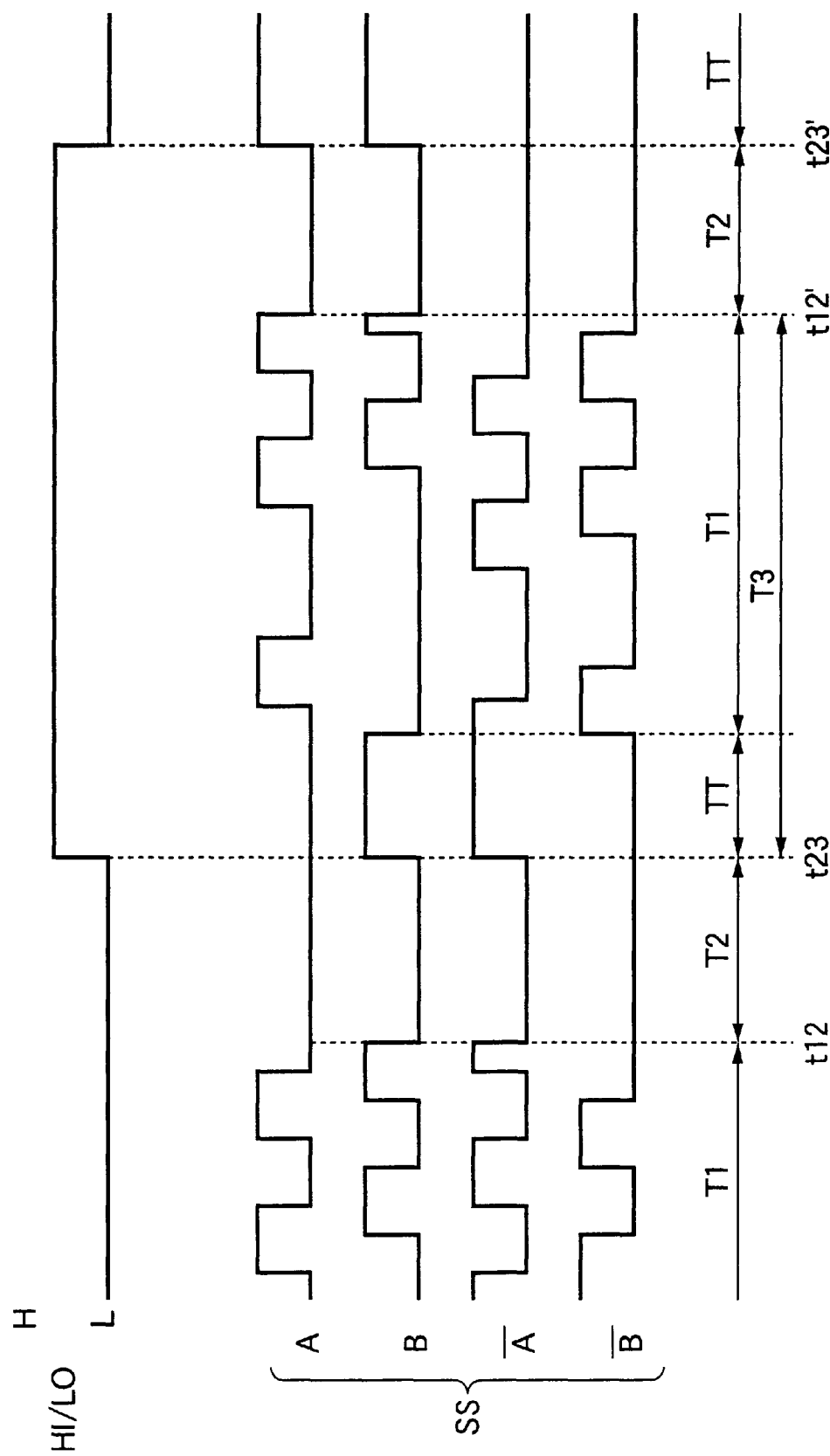
FIG. 6 is a timing chart depicting control over two-phase excitation holding.
Figure 7:
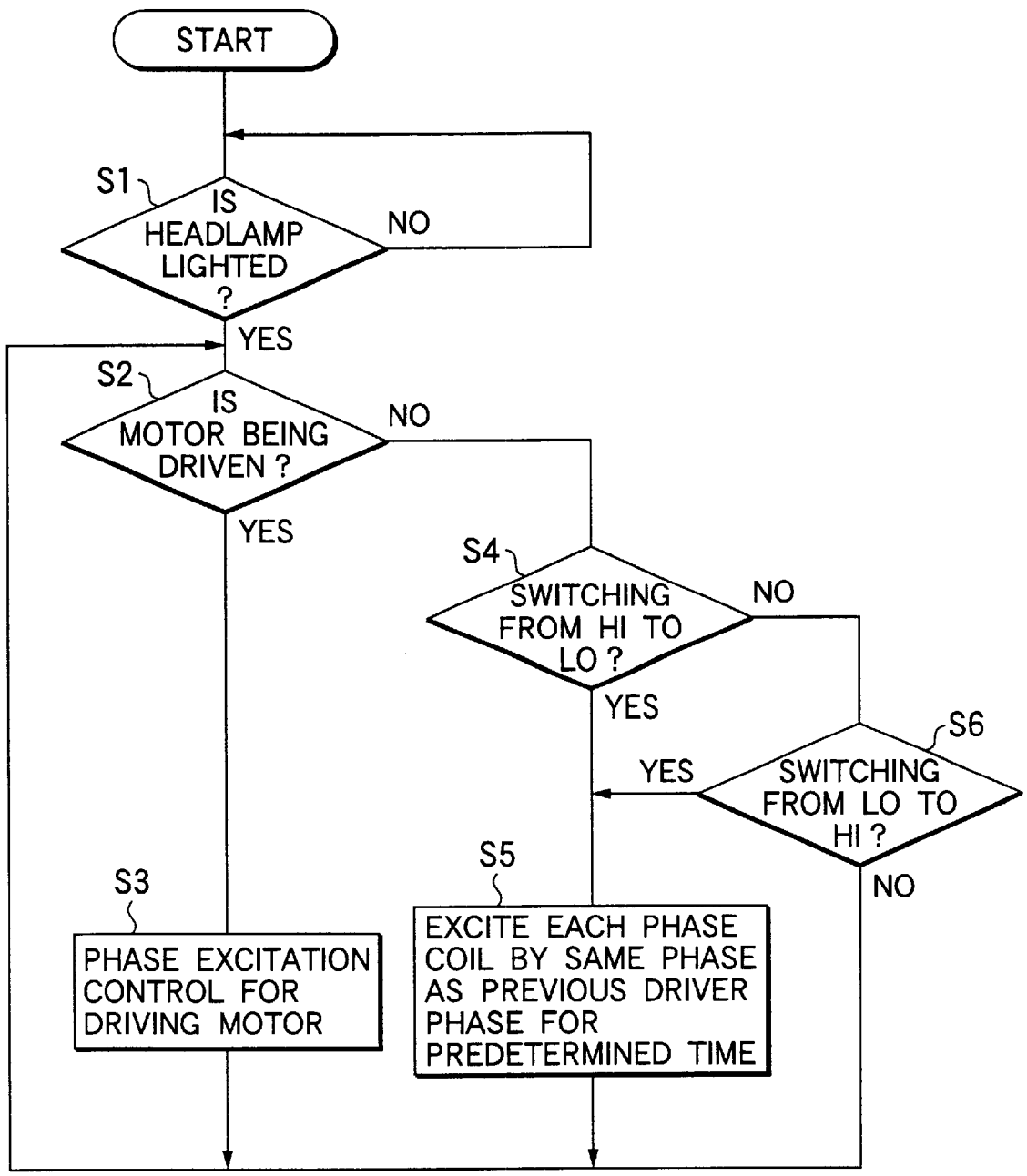
FIG. 7 is a flowchart showing a control procedure according to an embodiment of the present invention.

FIGS. 5 to 7 show an embodiment of the present invention with a two-lamp type automotive headlamp system wherein a mechanism for switching between a main beam (or high beam) and a sub-beam (or low beam) is arranged. As shown by system 31 in FIG. 4, a lamp on-off signal and main-sub beam switching signals are sent to a leveling control portion 33 and a switching control portion 34 when a headlamp switch 32 is operated. In this case, the leveling control portion 33 detects that a shock and the like are given to the reflector 14 or determines a possibility that a shock or the like may be given to the reflector 14 when the switching mechanism 27 is actuated by means of the beam switching signal sent when the headlamp switch 32 is operated.

The leveling control portion 33 is operable to supply a phase excitation signal to each phase coil of the stepping motor 19 as the driving source of the leveling mechanism 16, and the driving of the motor regulates the quantity of movement of the rod 20 thereby determining the tilted posture of the reflector 14.

The switching control portion 34 is operable to regulate the position of the shade 28 by supplying the excitation signal to the solenoid 30 forming the switching mechanism 27. A control signal indicating the presence or absence of excitation corresponding to the on/off state of a relay or a semiconductor switching element regulated by, for example, the beam switching signal is supplied to the solenoid 30.

FIG. 6 is a timing chart explaining an operating condition and each signal means. In FIG. 6:

Signal 'HI/LO'=a beam switching signal (e.g., H level means a high-beam emission, whereas L level means a low-beam emission); and Signal 'SS'=indicating each excited condition of the phase excitation signal (in the unipolar driven two-phase exciting operation of a four-phase motor, a phase A, a phase B and a phase A with a bar (with the bar mark '—' attached onto 'A' of FIG. 6) a phase B with a bar (with the bar mark '—' attached onto 'B' therein).

In FIG. 6, a period T1 refers to a period during which the motor is being driven. With the two-phase excitation in this embodiment of the invention, the phase excitation pattern is controlled so that two of the phases are in the excited condition within the same time step when time discretization is carried out by dividing the time axis into unit period steps.

In a period T2 following the period T1, all the phases remain in a non-excited condition. At the last driving point of time of the period T1 (see time 't12'), the phase A with the bar and the phase B are excited, whereas the phase A and the phase B with the bar are not excited.

A point of time when the period T2 is changed over to a period T3 (see time 't23') is equivalent to a point of time when the signal 'HI/LO' rises from the L level to the H level. In other words, the low beam is switched to the high beam at this point of time, and therefore, there is a possibility that a shock may be given to the reflector 14. Accordingly, the same phase excitation pattern as the last phase excitation pattern formed when the motor was last driven is supplied to the each phase coil for a period until a predetermined time 'TT' elapses with the time t23 as a starting point and then the driving condition (phase excitation control for turning a rotor) is restored. In other words, the same phase as the excitation phase at the time t12 (the phase A with the bar and the phase B are excited, whereas the phase A and the phase B with the bar are not excited) is established. With respect to the length of the time 'TT', the length thereof should be set longer than the time required to switch beams by taking into consideration an upper limit whereby the driving condition is restored in a timely manner.

Of course, the above-described control may be performed at the time of not only switching from low beams to high beams, but also switching the high beams to the low beams (see the time 't12' and 't23'' of FIG. 6).

FIG. 7 is a flowchart of the control procedure described above. At Step S1, it is determined whether the headlamp is turned on, and if the headlamp has not been turned on, no step is executed. Where the headlamp has been turned on, a decision is made in Step 2 as to whether the stepping motor 19 is being driven. Then Step S3 is followed where the motor is being driven, and under the phase excitation control of the motor, the motor is rotated in proportion to the amount of control from the leveling control portion 33. Then Step S2 is followed again.

In a non-excited condition of the motor at Step S2, Step S4 is followed and a decision is made on whether the switching of the high beam to the low beam is recognized. Where the high beam has been switched to the low beam according to the signal 'HI/LO', Step S5 is followed; however, where the high beam has not been switched to the low beam, Step S6 is followed.

At Step S5, the excitation control in the same phase as the last point of time when the motor was last driven during the predetermined period TT shown in FIG. 6 is executed and then Step S2 is followed again.

At Step S6, a decision is made on whether the low beam is switched to the high beam and where it is decided that the low beam has been switched to the high beam according to the signal 'HI/LO', Step S5 is followed, or otherwise Step S2 is followed again.

According to this embodiment of the invention, it is thus possible to prevent the rotor from being deviated from the original position, set out of tune, and so on by predicting the vibration and shock generated with the actuation of the switching mechanism and given to the reflector at the time of switching beams and by causing the stepping motor to generate the holding torque by the phase excitation.

Although the two-phase holding has been conducted for the period of TT during the two-phase exciting operation in the above description, the invention is not limited to the arrangement above, but may be arranged so that one-phase holding is conducted (i.e., out of the last excitation phase after the two-phase exciting operation is performed, only one phase coil on one side may be excited and held). Accordingly, only one of the two phases last positioned when the stepping motor is driven is excited before vibration or a shock is given to the reflector after the coils in the respective phases are then totally left non-excited in the stepping motor.

Figure 8:
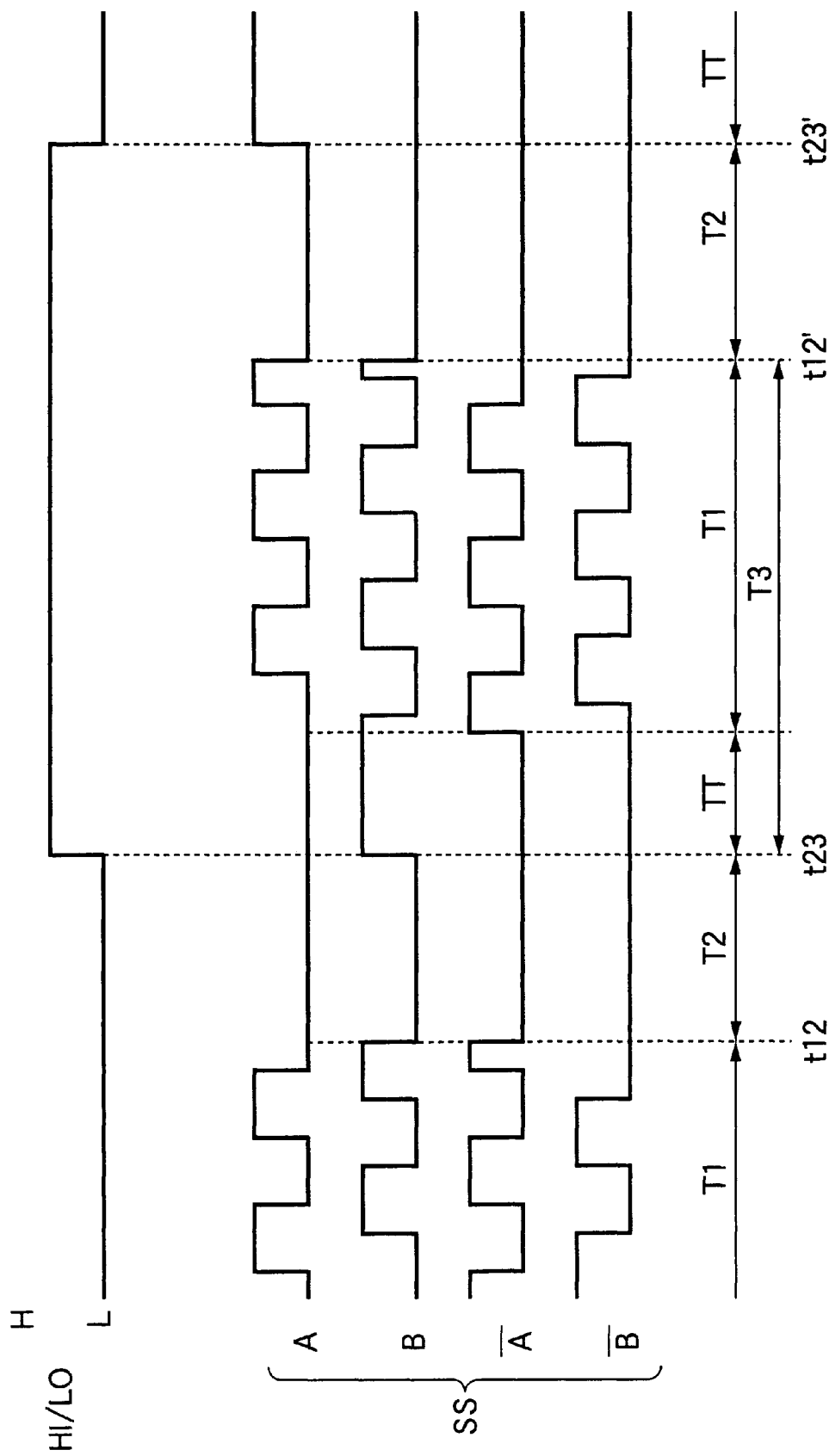
FIG. 8 is a timing chart depicting control over one-phase excitation holding.

FIG. 8 is a timing chart depicting another operating condition of the present invention. Reference symbols depicted for items in FIG. 8 that are the same as those for items in the Figures above represent the same items.

As shown in FIG. 8, the non-excited condition is maintained up to the period T2 after the phase B and the phase A with the bar are excited at the time t12. Thus, during the period TT, only the excitation phase (phase B) equivalent to a position by a half step prior to the phase A with the bar out of the last excitation phases (the phase B and the phase A with the bar) is excited. Similarly, the non-excited condition is maintained up to the period T2 after the phases A and B are excited at the time t12' and accordingly during the period TT only the excitation phase (phase A) equivalent to a position by a half step prior to the phase B out of the last excitation phases (the phases A and B) is excited. The motor is driven through the two-phase exciting operation for a period T1 after TT.

An embodiment of the present invention used in mode (II) above will now be described.

A control mechanism for controlling the luminous intensity distribution of the lighting device may mechanically drive a movable portion of an optical system member forming a lamp of a so-called luminous intensity distribution type. Of course, the luminous intensity distribution may also be controlled by an electrical means. With respect to the optical system member, it may include, but is not limited to a shade as will be described later, any member capable of positionally controlling a lens member, a reflector, a light source, etc. so as to vary luminous intensity distribution.

Figure 9:
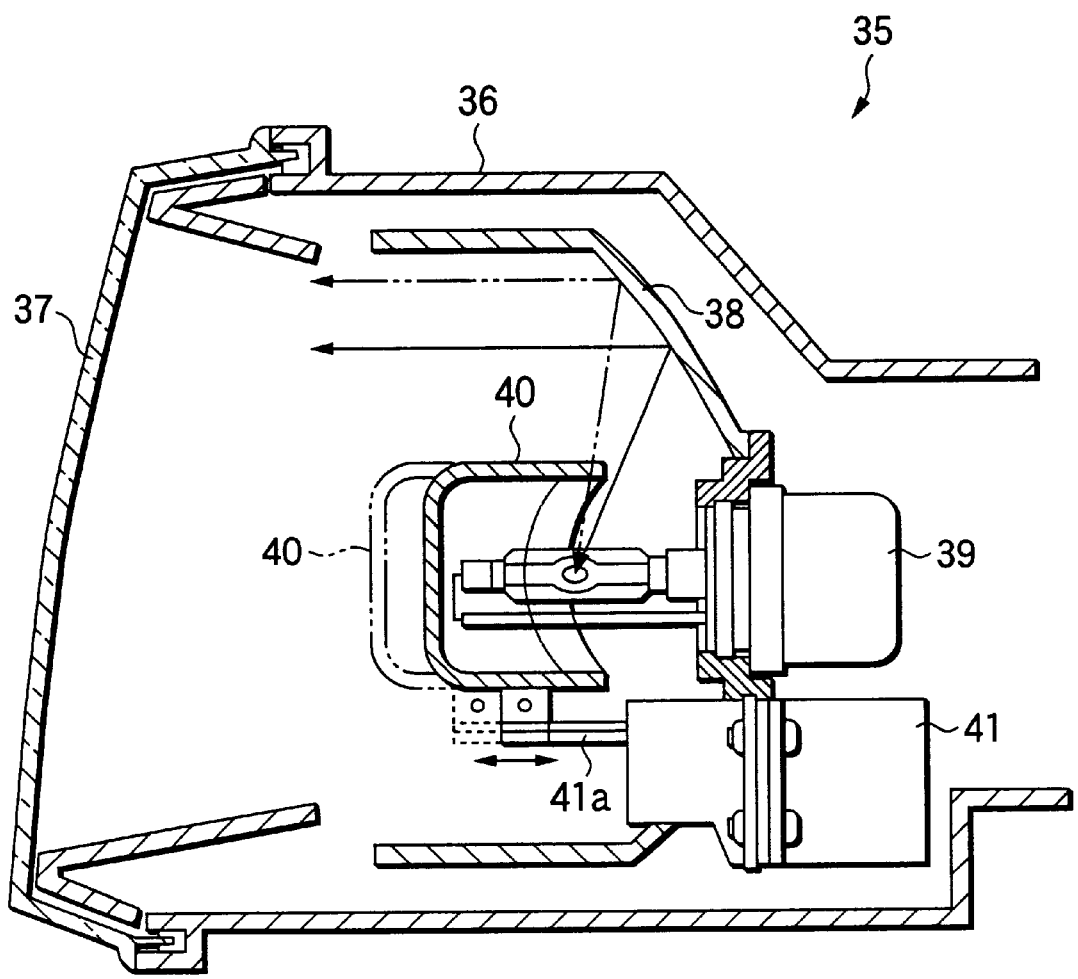
FIG. 9 is a diagram showing an embodiment of a luminous intensity distribution control mechanism according to the present invention.

FIG. 9 shows an example of a luminous intensity distribution control mechanism for freely varying the luminous intensity distribution by controlling the position of a shade, continuously or stepwise. As shown in this embodiment, the luminous intensity distribution control mechanism may be used to cover the light-emitting portion of the light source from the front.

The lighting device 35 of FIG. 9 includes a reflector 38 in the lamp chamber formed with a lamp body 36, a lens 37, a light source 39 fitted to the reflector, and the driving unit 41 of a shade 40. More specifically, a driving source such as a linear motor or a solenoid (not shown) is contained in the driving unit 41 disposed right below the light source 39, whereby the longitudinal position of the shade 40 attached to the front end portion of a rod 41a is regulated by longitudinally moving the rod.

With respect to the light directed from the light source 39 to the reflector 38, as the irradiation area (i.e., reflective area) toward the reflective surface and its area are varied with the position of the shade 40, the luminous intensity distribution is correspondingly and variably controlled continuously or stepwise. What makes the switching mechanism 27 shown in FIG. 4 different from this mechanism is that the former mechanism is used for switching beams by varying the shade position, while in this embodiment, the distribution of the reflective area occupying the luminous intensity distribution is varied by positionally controlling the shade 40 as shown in FIG. 9. As the leveling and aiming mechanisms used in this embodiment are similar to those shown in FIGS. 2 and 3, the description of these items is omitted. Moreover, a number of different mechanisms maybe employed in the internal structure of such a driving unit 41 and any one of such known mechanisms may be usable according to the invention.

Figure 10:
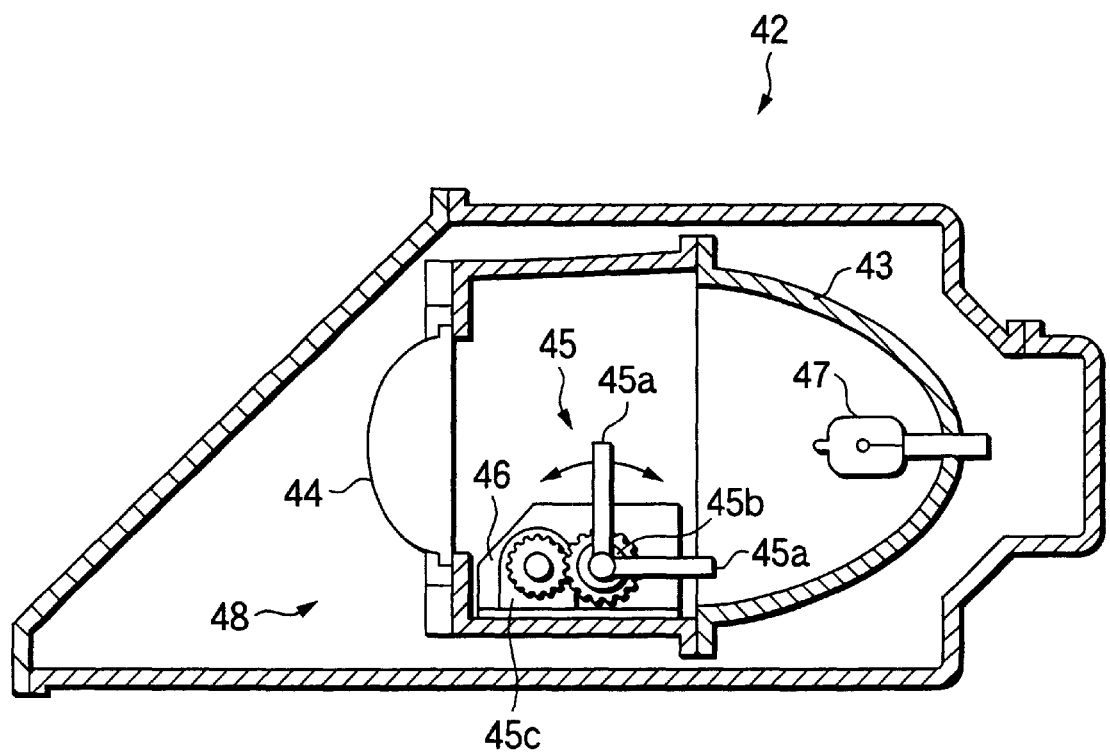
FIG. 10 is a diagram showing another embodiment of a luminous intensity distribution control mechanism according to present invention.

FIG. 10 shows an arrangement for controlling luminous intensity distribution in a projector type headlamp wherein the luminous intensity distribution may be varied by controlling the upper edge position of a shade.

A lighting device 42 of FIG. 10 is equipped with a lamp unit 48 comprising a projection lens 44 positioned in front of a reflector 43, a shade 45 positioned therebetween and its driving unit 46, and a light source 47 fitted to the reflector 43. With respect to the shade 45, a number of arrangements may be selected, including an arrangement wherein a plurality of blades 45a, 45a . . . are fitted to a rotary body 45b and rotated by a driving means 45c such as a motor so as to select a blade to regulate the upper edge shape and height of the shade 45 (see e.g., JP-A-6-76604). Also, an arrangement wherein an eccentric cylindrical body is rotated by a driving means to make the side edge of the cylindrical body regulate the upper edge shape and height of the shade, or any other arrangement of the sort mentioned above may be used. In this case, by freely changing the vertical height of the cutoff line in the low-beam luminous intensity distribution within an allowable range, distance visibility may be improved and dazzling light directed to pedestrians may be reduced.

In the arrangements described above, there are developed problems out of a shock, vibration and the like given to the reflector as a mechanical means employed when the luminous intensity distribution is controlled. In other words, where the luminous intensity distribution is changed during the time while or after an adjustment in the optical axis direction is made by the leveling mechanism, there is the possibility that the leveling condition may be affected when a shock and the like are given to the reflector.

Where a signal relating to a command to change the luminous intensity distribution is detected by the detection means 5, it is only necessary to secure the holding torque by carrying out phase excitation with the same excitation phase as the last excitation phase at the time when the stepping motor was last driven or otherwise by exciting only the coil in one of the last excitation phases at the time when the stepping motor was last driven. Therefore, this embodiment of the invention may be described by making the following replacements to the description given with reference to FIGS. 5 to 8.

In FIG. 5, the headlamp switch 32 is replaced with a luminous intensity distribution control command portion and the switching signal 'HI/LO' is replaced with a luminous intensity distribution control signal (e.g., a positioning signal for the shade 40 in FIG. 9). Further, the switching control portion 34 is replaced with a luminous intensity distribution control portion and the switching mechanism 27 is replaced with a luminous intensity distribution control mechanism.

In FIGS. 6 and 8, the switching signal 'HI/LO' is replaced with a luminous intensity distribution control signal and the signal concerned is set as a binary or a ternary signal, the binary and ternary signals representing the luminous intensity distributions whose conditions are different from one another. Further, points of time when the luminous intensity distribution varies are equivalent to the time t23 and t23'.

In FIG. 7, Step S6 is deleted and it is inquired whether variation in the luminous intensity distribution is recognized at Step S4. When the luminous intensity distribution is changed, Step S5 is followed, but when the luminous intensity distribution is not changed, Step S2 is followed again.

Thus, according to this embodiment of the invention, it is predicted that the vibration and shock accompanied with the change of luminous intensity distribution will be given to the reflector. Then the rotor can be prevented from being deviated from the position, set out of tune or the like by causing holding torque to be generated in the stepping motor by phase excitation.

An embodiment of the present invention used in mode (III) above will now be described. According to this embodiment of the invention, there are developed problems out of a shock, vibration and the like given to the reflector as a mechanical means employed when the light color is controlled. That is, where the light color of the lamp is changed during the time while or after an adjustment in the optical axis direction is made by the leveling mechanism, there is the possibility that the leveling condition may go wrong when a shock and the like are given to the reflector.

In case where a signal relating to a command to change the light color is detected by the detection means 5, it is only necessary to secure the holding torque by carrying out phase excitation with the same excitation phase as the last excitation phase at the time when the stepping motor was last driven or otherwise by exciting only the coil in one of the last excitation phases at the time when the stepping motor was last driven.

Figure 11:
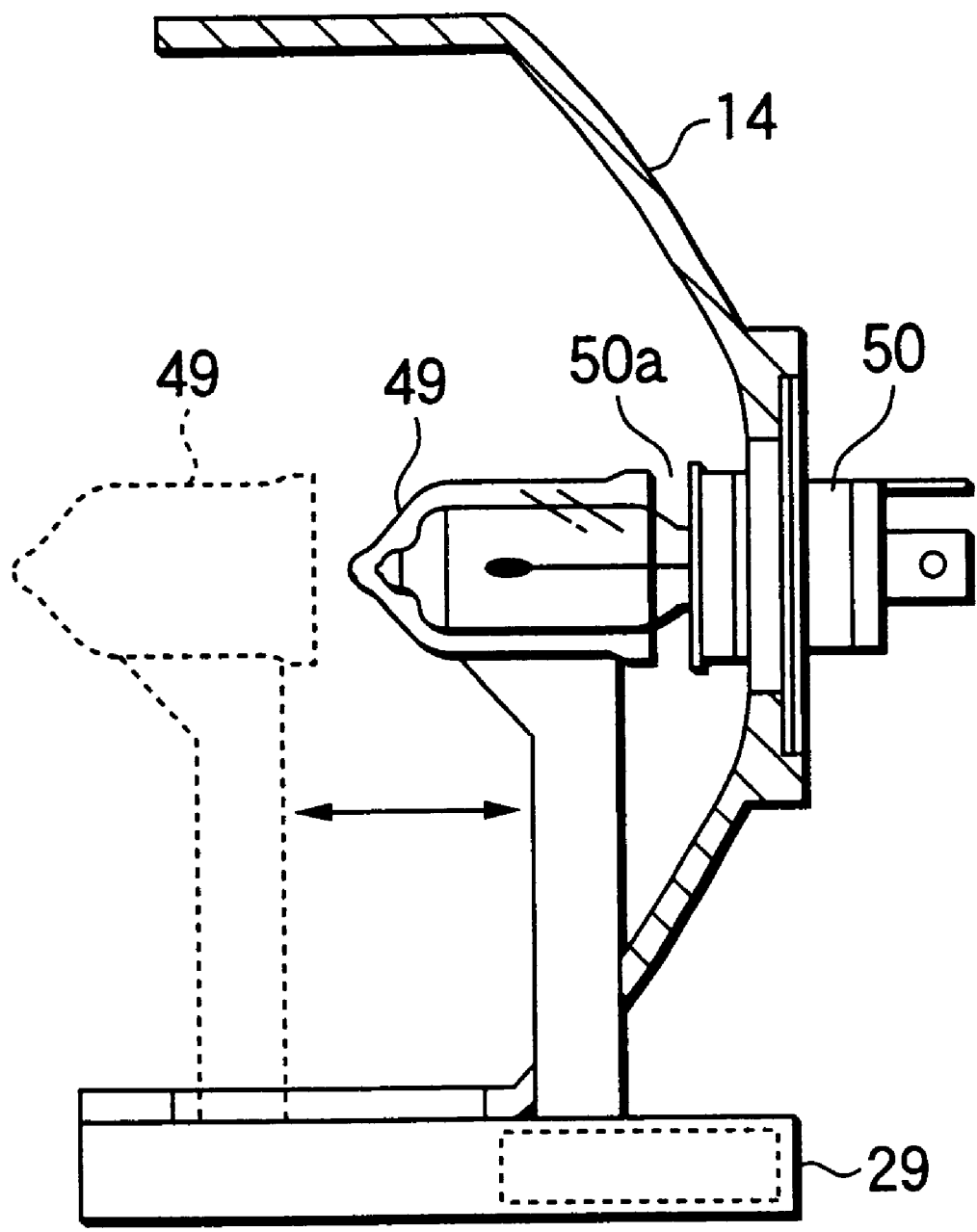
FIG. 11 is a diagram depicting a light color control mechanism according to the present invention.

When the same construction as shown in FIG. 4 is employed, a white light bulb (halogen bulb or the like) is used as a light source and the shade is replaced with a colored transparent globe or a colored filter member. In other words, as shown in FIG. 11, a colored transparent globe 49 (such as a light yellow globe or the like) is formed such that it is a size larger than the light emitting portion 50a of a light source 50 and made movable in the longitudinal direction of the lighting device by the carrying mechanism 29 of the globe. While the periphery of the light emitting portion 50a of the light source 50 is wholly covered with the colored transparent globe 49, the light color of the lamp is regulated by the color that the globe 49 has. However, the color of the light source is controlled so that the color thereof may become similar to the color of the lamp when the light emitted from the light source 50 reaches a position where no light from the light source 50 passes through the globe by moving the colored transparent globe 49 forward.

Therefore, this embodiment of the invention may be described by making the following replacements to the description given with reference to FIGS. 5 to 8.

In FIG. 5, the headlamp switch 32 is replaced with a light color changeover switch and the switching signal 'HI/LO' is replaced with a light color switching signal. Further, the switching control portion 34 is not used as a beam switching means but used to send out a light color switching signal to a (light color) switching mechanism.

In FIGS. 6 and 8, the switching signal 'HI/LO' is replaced with a light color switching signal (e.g., the signal concerned at the H level is set white, whereas at the L level is set light yellow).

In FIG. 7, Step S6 is deleted and it is inquired whether variation in the light color is recognized at Step S4. When the light color is changed, Step S5 is followed but when the light color is not changed, Step S2 is followed again.

Thus, according to this embodiment of the invention, it is predicted that the vibration and shock accompanied with the change of light color will be given to the reflector. Then the rotor can be prevented from being deviated from the position, set out of tune or the like by causing holding torque to be generated in the stepping motor by phase excitation.

As described above according to the present invention, it is possible to prevent a rotor from being deviated from the original position, set out of tune and so on by predicting the vibration or shock given to the reflector by causing a motor to generate a necessary and sufficient holding torque, whereby vibration damping and shock resistance can be improved.

Also, it is possible to easily predict the vibration or shock given to the reflector at the time of switching the plurality of beam emissions, such that the rotor is prevented from being deviated from the original position, set out of tune and so on.

Also according to the present invention, it is possible to easily predict the vibration or shock given to the reflector at the time of varying the luminous intensity distribution, wherein the rotor is prevented from being deviated from the original position, set out of tune and so on.

The present invention also makes it possible to easily predict an external force, such as a vibration or shock given to the reflector at the time of changing the color of irradiation light, wherein the rotor is prevented from being deviated from the original position, set out of tune and so on.

What is claimed is:

1. A vehicle lamp system comprising:

a reflector operable to reflect light from a lighting device;

a leveling device operable to control a position of the reflector;

a stepping motor operable as a driving source of the leveling device, the stepping motor including a plurality of phase coils; and an irradiation controller operable to record data including a plurality of excitation phases of the plurality of phase coils at a time when the stepping motor was last driven, and provide the data to the stepping motor for use in exciting the plurality of coils, wherein after a non-excited condition of the plurality of phase coils and before an external force is given to the reflector, each phase coil of the plurality of phase coils is operable to be excited with an excitation phase that is the same as a respective last excitation phase at the time when the stepping motor was last driven, or an excitation phase that is the same as only one of the plurality of excitation phases at the time when the stepping motor was last driven.

2. A vehicle lamp system as claimed in claim 1, further including a switching mechanism operable to switch between a plurality of beam emissions.

3. A vehicle lamp system as claimed in claim 2, wherein the switching mechanism is used to switch between high and low beam emissions of the lamp system.

4. A vehicle lamp system as claimed in claim 1, further including a detector operable to determine that the reflector has received, or that there is a possibility that the reflector will receive the external force, and provide the determination to the irradiation controller or the stepping motor.

5. A vehicle lamp system as claimed in claim 4, further including a luminous controller operable to control a luminous intensity distribution of the lamp system.

6. A vehicle lamp system as claimed in claim further including a color controller operable to control a color of irradiation light of the lamp system.

7. A method for controlling a position of a reflector comprising:

recording data including a plurality of excitation phases of a plurality of phase coils of a motor as the motor drives an irradiation axis used to set the position of the reflector; and exciting each of the plurality of phase coils to generate a holding torque of the motor based on the recorded data, after a non-excited condition of the plurality of phase coils and before an external force is given to the reflector, with an excitation phase that is the same as a respective last excitation phase at the time when the motor was last driven, or an excitation phase that is the same as only one of the plurality of excitation phases at the time when the motor was last driven.

8. A method for controlling a position of a reflector according to claim 7, further including determining that the reflector has received, or that there is a possibility that the reflector will receive the external force.

9. A method for controlling a position of a reflector according to claim 8 wherein the determination is made at a time of switching beams based on an operating command provided to a switching mechanism.

10. A method for controlling a position of a reflector according to claim 8 wherein the determination is made at a time of changing a luminous intensity distribution according to an operating command given to a luminous intensity control mechanism.

11. A method for controlling a position of a reflector according to claim 8 wherein the determination is made at a time of changing a light color according to an operating command given to a color control mechanism.

* * * * *